(12) United States Patent
Russegger

(10) Patent No.: US 7,158,718 B2
(45) Date of Patent: Jan. 2, 2007

(54) ELECTRIC HEATING DEVICE

(75) Inventor: Elias Russegger, Golling (AT)

(73) Assignee: Watlow Electric Manufacturing Company, St. Louis, MO (US)

( * ) Notice: Subject to any disclaimer, the term of this patent is extended or adjusted under 35 U.S.C. 154(b) by 267 days.

(21) Appl. No.: 10/311,515

(22) PCT Filed: May 15, 2001

(86) PCT No.: PCT/EP01/05470

§ 371 (c)(1),
(2), (4) Date: Dec. 18, 2002

(87) PCT Pub. No.: WO01/97566

PCT Pub. Date: Dec. 20, 2001

(65) Prior Publication Data

US 2004/0028396 A1    Feb. 12, 2004

(30) Foreign Application Priority Data

Jun. 14, 2000 (DE) ............................. 100 29 244
Nov. 22, 2000 (DE) ............................. 200 19 890 U

(51) Int. Cl.
*F24H 1/10* (2006.01)

(52) U.S. Cl. ........................... 392/488; 219/207

(58) Field of Classification Search .............. 219/205, 219/207, 209, 548, 424, 505, 543, 535; 392/465, 392/468, 478, 480, 488, 502, 539, 479; 338/22 R
See application file for complete search history.

(56) References Cited

U.S. PATENT DOCUMENTS

| | | | |
|---|---|---|---|
| 2,519,920 A * | 8/1950 | Miner | 392/480 |
| 3,680,630 A * | 8/1972 | Watts | 165/263 |
| 3,791,863 A * | 2/1974 | Quirk | 392/459 |
| 4,345,141 A * | 8/1982 | Little | 219/207 |
| 4,371,779 A | 2/1983 | Meixner et al. | |
| 4,399,796 A | 8/1983 | Kato et al. | |
| 4,407,254 A | 10/1983 | Kato et al. | |
| 4,477,715 A * | 10/1984 | Bell et al. | 219/205 |
| 4,489,232 A | 12/1984 | Wada et al. | |
| 4,593,670 A | 6/1986 | Nara et al. | |
| 4,651,702 A | 3/1987 | Nara et al. | |
| 4,818,842 A * | 4/1989 | Walty | 219/205 |
| 4,870,249 A * | 9/1989 | Kayanuma et al. | 219/206 |
| 4,874,925 A | 10/1989 | Dickerson | |
| 4,899,032 A | 2/1990 | Schwarzl et al. | |
| 4,982,068 A * | 1/1991 | Pollock et al. | 392/488 |
| 5,271,086 A * | 12/1993 | Kamiyama et al. | 392/483 |
| 5,278,940 A | 1/1994 | Muller | |
| 5,401,935 A * | 3/1995 | Smith et al. | 219/206 |
| 5,434,388 A | 7/1995 | Kralik et al. | |
| 5,504,307 A * | 4/1996 | Hayashi et al. | 219/543 |

(Continued)

FOREIGN PATENT DOCUMENTS

DE    2 214 142    9/1972

(Continued)

*Primary Examiner*—Thor S. Campbell
(74) *Attorney, Agent, or Firm*—Harness, Dickey & Pierce P.L.C.

(57) ABSTRACT

An electric heating device especially for fluids, such as liquid fuel, includes a heat element with an electrical resistance. The heat element can be connected to an electrical power source and also includes a carrier element to which en electrically conductive heat layer of a PTC material with positive temperature resistance co-efficient is applied. The heat layer can, at least in two interspaced positions, be connected to the electrical power source.

5 Claims, 2 Drawing Sheets

U.S. PATENT DOCUMENTS

| | | | | |
|---|---|---|---|---|
| 5,801,612 A | * | 9/1998 | Chandler et al. | 338/22 R |
| 6,797,925 B1 | * | 9/2004 | Gunther et al. | 219/424 |
| 2001/0003336 A1 | * | 6/2001 | Abbott et al. | 219/543 |
| 2002/0040898 A1 | * | 4/2002 | Von Arx et al. | 219/535 |

FOREIGN PATENT DOCUMENTS

| | | | |
|---|---|---|---|
| DE | 3545267 | * | 6/1987 |
| DE | 37 16 142 | | 11/1987 |
| DE | 38 36 857 | | 5/1989 |
| DE | 197 36 245 | | 2/1998 |
| DE | 198 10 848 | | 8/1999 |
| DE | 198 23 493 | | 8/1999 |
| EP | 0 312 204 | | 4/1989 |
| EP | 0 495 402 | | 7/1992 |
| EP | 0 899 985 | | 8/1997 |
| EP | 0 820 214 | | 1/1998 |
| FR | 2 404 985 | | 4/1979 |
| GB | 2 143 708 | | 2/1985 |
| GB | 2 197 419 | | 5/1988 |
| JP | 62151760 | * | 7/1987 |
| JP | 08213202 | * | 8/1996 |
| JP | 411288802 | * | 10/1999 |

* cited by examiner

ELECTRIC HEATING DEVICE

BACKGROUND

The present invention refers to an electrical heating device, in particular, for fluids such as liquid fuel, with a heating element which comprises an electrical resistance and which can be connected to an electrical power source.

One such device is known in the market. In it, a so called "heating cartridge" is arranged in a fuel line, such as an oil supply line for an oil burner. The cartridge comprises a heating coil which has a thermo-element and extends into the fuel stream that is transported inside the fuel line. The thermo-element is used to record and regulate the temperature. If an electrical voltage is applied to the heating cartridge, it and the fuel running past will expand. The advantage of such a heating process is that the heated fuel has a low viscosity and therefore forms a very thin fuel film on the wall of the customary hollow-cone nozzle. This in turn reduces the flow even when the nozzle opening is relatively wide. A relatively wide nozzle opening is desirable to prevent plugging.

In this manner, low performance atomizing burners can be used with a relatively wide nozzle diameter. Furthermore, due to the low viscosity, the nozzle atomizes the fuel more evenly and into a finer spray, thus improving ignition. The overall effect of heating the fuel is a reduction in fuel consumption.

However, the device known in the market has the disadvantage that its design is complicated, and it is therefore difficult to integrate it into the oil supply line. Furthermore, regulating with a thermo-element and an electronic regulator and control unit is relatively complex, which increases the cost. Finally, in many cases, the heating coil for heating the fuel has to become quite hot, which causes the fuel that is in direct contact with the heating coil to evaporate and to form an insulating vapor lock between the remaining liquid fuel and the heating coil. This thermally insulating vapor lock reduces the heat transfer between the heating coil and the fuel, which means that more energy is required for heating the fuel, and the fuel is not evenly heated.

Another electrical heating device of the above named type that is known in the market is used, for example, as a hot plate. In this device, too, the temperature of the hot plate is recorded by a thermo-element and adjusted via a separate regulator and control unit. This is also technically complex and, in addition, the reaction is sluggish.

It is therefore the object of the present invention to further develop a heating device of the above named type such that it is easy to manufacture and easy to integrate, that its technical complexity is reduced, that the fuel can be heated evenly, and that a quick reaction time can be achieved for temperature regulation.

SUMMARY

This object is achieved by means of the invention in that the heating element comprises a carrier element to which an electrically conducting heating layer made of PTC material with a positive resistance coefficient is applied, and that the layer can be connected to the electrical power supply in at least two separate places.

When PTC material is used, it becomes completely unnecessary to provide an external regulator, since the specific resistance of this material changes according to the temperature; that is, as the temperature drops, the specific electrical resistance of the material decreases, which causes the current that passes through it to rise, provided that the voltage is constant. This in turn causes a higher heating output and a rise in temperature, with the opposite effect on the resistance. Therefore, such a material is self regulating. To set a certain temperature, it is only necessary to provide a constant voltage, while neither a regulator nor a thermo-element is necessary.

Furthermore, due to the small mass of the heating layer, the heating device according to the invention can be very rapidly heated up, and its overall dynamics can be distinctive. This in turn leads to the high efficiency of the device. The maximum temperatures that can be achieved with the heating device are approximately between 500 and 1000° C.

In a first aspect of the invention, an automatic limit can be established for the temperatures that can be achieved with the heating device in that a PTC material is used whose temperature resistance curve, starting at a certain temperature, changes its gradient in the form of a "kink." (See FIG. 2). As shown, the gradient of the temperature versus the resistance changes at this kink and thus with an increase in temperature, the corresponding increase in resistance is less, or limited, after this kink.

In this, it is particularly preferred when the gradient change is formed such that a certain temperature can be held constant. In that case, the local temperature, which is at least partly determined by the characteristics of the material, is "self-adjusting", and a temperature sensor and an associated control and/or regulator device is not absolutely necessary. This self-adjustment can also be a reliable means to prevent overheating. The fact that additional components can be eliminated considerably simplifies the manufacture of the heating device according to the invention.

However, it is also possible for the electrical heating device to comprise an electronic control and/or regulating device which can be used to set a certain temperature in at least one section of the heating layer. In this, the heating layer itself can be used as a temperature sensor, since its resistance is a measure of the temperature. The resistance of the heating layer can be evaluated in the control and regulating device, and the appropriate temperature can be determined.

Advantageously, the heating layer is applied by means of a thermal process, in particular by means of plasma deposition, plasma spraying, high-speed flame spraying, etc. This is provided in another aspect of the invention. On the one hand, such a thermal process is cost-effective and, on the other hand, it allows optimal bonding between the layers and the carrier element and also between the layers themselves.

Another aspect is characterized in that the heating layer comprises a ceramic powder. This makes manufacturing easy and provides the layer with special thermal stability. The heating layer may also comprise a metal powder, which improves its application to the carrier element.

In the other aspect of the invention, the carrier element is made of an electrically conducting material, and an electrically insulating layer is provided between the heating layer and the carrier element. It is often better to use carrier elements made of metal because they are easier to manufacture, but metals are electrical conductors. Therefore, in such cases, the heating layer must be electrically insulated from the carrier element by a layer. Thanks to this aspect, the heating device according to the invention can therefore be used with the customary metal carrier elements.

In this aspect, the electrical conductivity of the carrier element can be used to channel the electrical output to or from the heating layer. This is possible when, as provided in another aspect the electrical power source is a low voltage source and the heating layer is electrically connected in one place with the carrier element.

A layer that electrically insulates the heating layer from the carrier element is unnecessary if the carrier element itself is made of an electrically insulating material. Such materials include, in particular, many temperature-resistant plastics, but also ceramic materials and glass. In that case, higher voltages can also be used as the electrical power supply for the heating layer without the necessity of an electrically insulating layer. As a general principle, the heating device according to the invention can be operated with voltages starting at about 1.5 V, although voltages up to 220 V and more are possible as well.

User handling of the device according to the invention made easier by an aspect in which an electrically insulating layer is provided on the side of the heating layer that is opposite the carrier element. This layer protects the user to come in direct contact with the live heating layer.

One example for a preferred material for the electrically conducting layers is aluminum oxide, $Al_2O_3$, and another is zircon oxide. As a general principle, at least the insulating layer between the heating layer and the carrier element should be a good electrical insulator, but a poor thermal insulator. Furthermore, the material should be temperature-resistant and able to follow the thermal expansion movements of the carrier element. This is the case with aluminum oxide and with zircon oxide.

Good bonding of the insulation layers is achieved when they are applied by means of a thermal process in particular plasma deposition, vapor deposition or highspeed flame spraying.

One aspect of the heating device is characterized in that the thickness of the heating layer varies over the length of the carrier element, such that the output distribution or output absorption varies also over the length of the carrier element. In this manner, a certain temperature profile can be achieved in the two directions of the carrier element's plane without the necessity of a complex regulator or control device. The variation in thickness can be continuous, which would also allow for a continuous output distribution.

In this, it is particularly preferred if, during operation, the temperature difference between the carrier element and the material to be heated can be held constant over the length of the carrier element. This would take into account the fact that the temperature of the material to be heated may change over the length of the carrier element, e.g., colder temperature at the edge. By varying the temperature of the heating layer over the length of the carrier element, the heating up process can be optimized, and, if necessary, the length of the heating layer necessary for heating can be reduced.

The thickness range of the layers can be selected to be optimal. Accordingly, the thickness of at least one of the layers is in the range of 0.002 to 0.2 mm, but preferably in the range of 0.005 and 0.1 mm. As far as the heating layer is concerned, layers of such thickness form a resistance that is necessary for achieving the required temperatures in the range of up to 400° C. On the other hand, with regard to the electrically insulating layers, a thickness in the above range ensures that the thermal insulation effect is as low as possible.

Furthermore, the aspects of the invention name a number of especially preferred applications. Thus, the heating device can preferably be used for the heating of oil supplied to a burner, as an instantaneous water heater, as a hot plate, for heating the coolant in automobiles, for heating fuel filters for paraffin precipitation, for heating windshields or mirrors, for the de-icing of aircraft wings, for heating the walls of rooms or for heating floors, e.g., to prevent freezing, or as a warming plate. The heating device according to the invention can be applied to any regular or irregular surfaces with any geometry, and also to uneven and/or rough surfaces. It is possible to apply it cost effectively with a robot.

An aspect of the invention in which the carrier element comprises a tubular element is suitable for the heating of fluids.

In a particularly preferred aspect of the invention with a tubular carrier element, the element comprises a fuel line with an inlet and an outlet, whereby at least some parts of the heating layer are applied to a wall of the fuel line. Thus, a heating coil or the small contact surface between the same and the fuel are completely unnecessary in the device according to the invention. Instead, at least one section of the fuel line wall is heated by the heating layer. The contact surface thus created between the heated fuel line wall and the fuel itself is considerably larger than the contact surface between the fuel and a heating coil, which means that the temperature of the wall itself can be lower, thus reducing the danger of fuel vapor formation. Of course, the more the surface of the fuel line wall increases, the more apparent this advantage becomes. It is therefore best if the places where the poles of the electrical power source are connected with the heating layer are separated from each other as far as possible, for example, one at the inlet and one at the outlet.

In one aspect, the fuel line has an injection nozzle at one end. This has the advantage that the path from the heated area to the injection nozzle is relatively short. If need be, the injection nozzle can also be heated as well by means of an appropriate coating, which in addition promotes the formation of an optimal fuel spray.

In a particularly preferred aspect, the fuel line, at least in the area of the heating layer, comprises an annular chamber through which the fuel is led. In this manner, the actual fuel volume to be heated is reduced, thus, on the one hand, reducing the required heat output and, on the other hand, improving temperature distribution in the fuel that flows through the fuel line, as well as shortening the regulating reaction time.

Furthermore, a contact means for the heating layer should be provided that is particularly easy to handle. According to it, the device is provided with at least one contact ring that can be pulled onto the fuel line and establishes an electrical contact with the heating layer. For example, such a contact can be made via a blade which, when pulled on, scores an electrical insulation layer that may exist on the heating layer and digs into the heating layer, thus ensuring a safe contact.

BRIEF DESCRIPTION OF THE DRAWINGS

The present invention will become more fully understood from the detailed description and the accompanying drawings, wherein.

DETAILED DESCRIPTION

Figure 1:
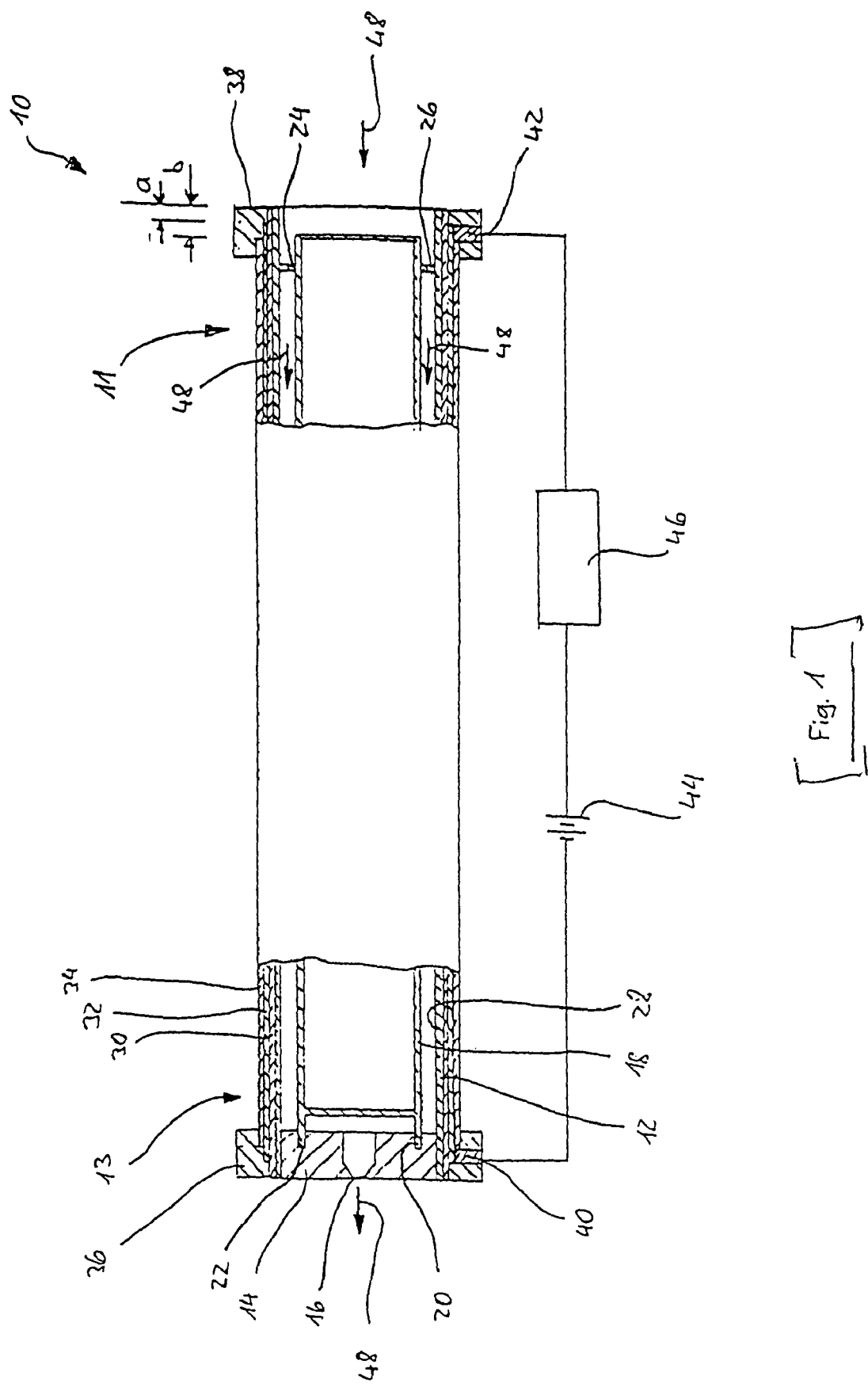
FIG. 1 is a side partial cross-sectional view of a heating device in accordance with the principles of the present invention.
Figure 2:
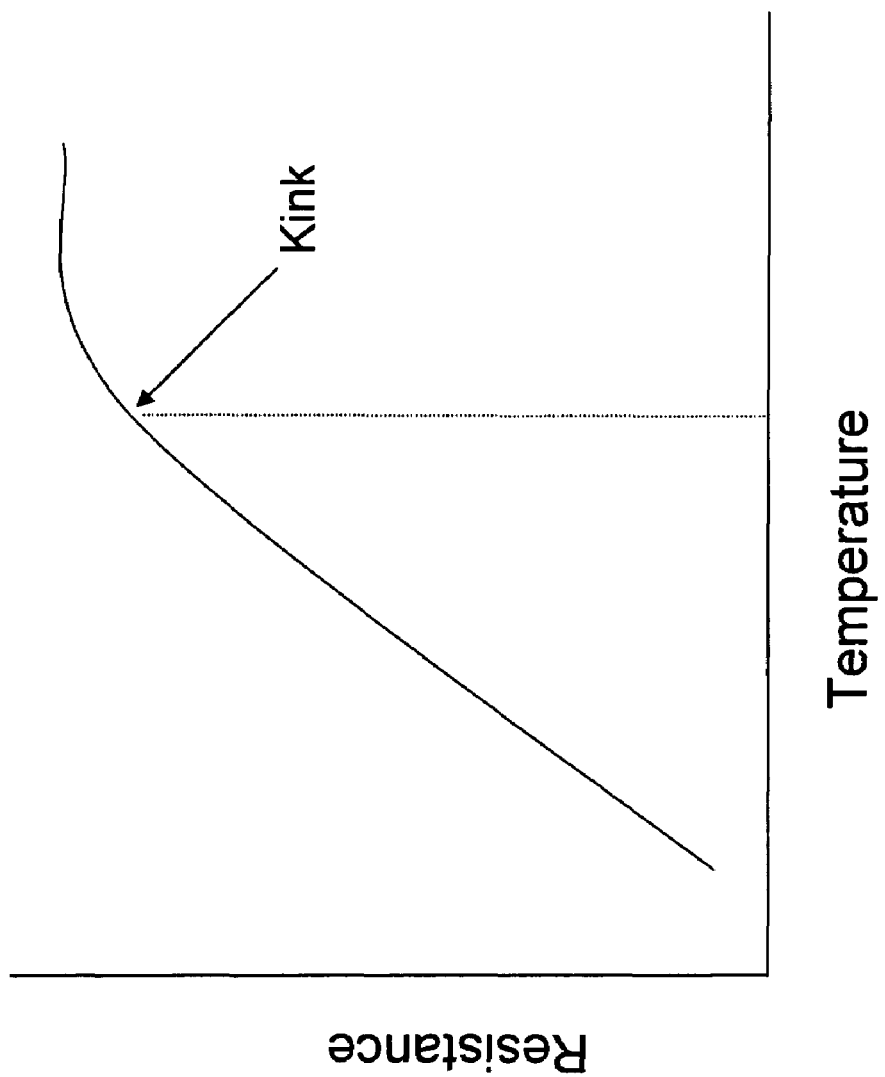
FIG. 2 is a graph of a temperature versus resistance curve illustrating a kink in accordance with the principles of the present invention.

In the drawing, a device for the heating of fuel is identified by the overall reference number 10. The device 10 is shown with partial sections cut out and comprises a tube which at the end which is at the left end is provided with an outlet 13 and which is closed by a nozzle piece 14. Nozzle piece 14 is welded into tube 12. Tube 12 is open at its right end, thus forming an inlet 11. At this open end, it can be provided with a thread not shown, to connect it to a fuel supply. Nozzle piece 14 is provided with a central nozzle opening 16, whose cross section tapers toward the outside, through which the fuel is discharged from the tube 12 during operation, and a fuel spray is generated.

A hollow displacer 18 is provided coaxially to the tube 12 and in the interior of said tube. The left end of the displacer 18 is supported by feet 20 in associated recesses 22 in the nozzle piece 16. At its right end, it is fastened to the interior wall of tube 12 by a washer 24. Along its entire circumference, this washer 24 is provided with holes 26 through which during operation the fuel can flow into an annular chamber 28 formed between the displacer 18 and tube 12.

Tube 12 is a conventional steel tube, such as is used for fuel lines, e.g., for oil lines leading to heating-oil burners, etc.

On its radially outside casing surface, an electrically insulating layer 30 of aluminum oxide is applied by means of plasma deposition. The thickness of the electrically insulating layer is about 0.1 mm. To the electrically insulating layer 30, a heating layer 32 is applied by means of powder plasma deposition, but this layer, in contrast to the insulating layer 30, does not extend over the entire length of tube 12, but ends at a distance a before the two ends of tube 12.

From end 11 at the outlet to end 13 at the inlet, the thickness of the heating layer 32 decreases from about 0.1 mm to about 0.05 mm. The material of heating layer 32 is a nickel, chromium and iron alloy with a positive temperature coefficient PTC. The nickel, chromium and iron alloy is embedded in a base of powdery ceramic material. An outer electrically insulating layer 34 is applied in turn to heating layer 32, also by means of plasma deposition. This layer 34 also consists of aluminum oxide and is separated by a distance b from the two ends of tube 12. This distance b is slightly greater that distance a, which means that the two ends of heating layer 32 are free.

At the two ends of tube 12, i.e., in separate places, contact rings 36, 38 are pulled onto the tube 12 and its layers 30, 32 and 34. The two contact rings 36 and 38 are made of an electrically insulating material, such as plastic. The radially inside annular surface of the contact rings 36 and 38, which faces tube 12, is slightly graduated to take into consideration that the outer electrically insulating layer 34 ends by a distance b before the end of pipe 12 and the heating layer 32 by a distance a. Contact pins 40, 42 are inserted into contact rings 36, 38. These contact pins 40, 42 are made of an electrically conducting material; on the one side the contact pins 40, 42 contact heating layer 32 and, on the other side, the contact pins 40, 42 can be connected to a voltage source 44 via an electrical line 45 and a control unit 46.

Device 10 functions as follows: Via a pump, not shown, and via a supply line, also not shown, a fuel, such as heating oil, is conducted through tube 12 from inlet 11 to outlet 13 as shown by arrows 48. In tube 12, only annular space 28 between displacer 18 and the radially inside casing surface of tube 12 is available in the area of the lengthwise extension of heating layer 32. At this point it should be noted that neither displacer 28 nor heating layer 32 or insulating layers 30, 34 necessarily have to extend over the entire length of tube 12. However, the larger the contact surface between the heated wall and the fuel, the more heat is generated for the fuel.

When control unit 46 causes the closing of the circuit formed by voltage source 44, line 45, control pins 40, 42 and heating layer 32, heating layer 32 occurs between contact rings 36, 38, i.e., substantially over the entire length of tube 12. Due to the fact that heating layer 32 is thicker at inlet end 11 than at outlet end 13, more heat is generated at the former than at the latter. The electrically insulating layer 30 transfers the heating of heating layer 32 through tube 12, such that tube 12 is substantially heated as desired over its entire length and its entire circumferential area. If the right kind of material is chosen for nozzle piece 14, this ensures that as the result of heat transfer, nozzle piece 14 and nozzle opening 16 are heated as well.

The fuel, on the way from the inlet end 11 to the outlet end 13, passes the heated inner wall of tube 12 in the direction of arrow 48 and is thus also heated along its flow path. Due to the fact that the thickness of heating layer 32 differs from one end to the other, the temperature of tube 12 also rises from inlet end 11 toward outlet end 13, such that the temperature difference, which determines the heat transfer between tube 12 and fuel 48, can be held substantially constant throughout the flow path of fuel 48. In this manner, a large amount of thermal energy can be injected into fuel 48 over a relatively short flow distance.

Insulation layers 30, 34 reliably protect the operators who are handling device 10 from contact with live elements. Furthermore, the material and the thickness of the outer insulating layer 34 can be selectively chosen, which means that this layer provides thermal insulation as well, thus reducing the energy requirement even more. It will also be appreciated that instead of a D.C. current source, an A.C. current source of higher voltage can be used as well.

Furthermore, in an aspect not shown, the radially outside casing surface of displacer 18 is also provided with insulating layers and a heating layer, which means that the two boundary walls of the annular space thus formed can be heated, causing the fuel to be heated even more efficiently.

In another aspect not shown, there is no contact ring at one end of the tube. Instead, the inner electrically insulating layer, i.e., the layer which electrically insulates the heating layer from the tube, is slightly recessed at that end, which means that there is electrical contact in that place between the heating layer and the tube. In that case, which for safety reasons is naturally possible only with a low voltage source, the tube can be used as one of the two supply lines for the electrical output.

What is claimed is:

1. An electrical heating device comprising:
    a heating layer applied by a thermal process on a tubular carrier element comprising an inlet and an outlet, the heating layer comprising a PTC material having a temperature resistance curve defining a kink, wherein the kink provides an automatic limit to maintain a constant temperature;
    an injection nozzle disposed proximate the outlet of the tube; and
    a displacer disposed within the tubular carrier element such that an annular chamber is formed between the tubular carrier element and the displacer for allowing passage of a fluid to be heated, wherein the fluid does not flow inside the displacer.

2. A method of forming an electrical heating device, the method comprising the steps of:
    applying a heating layer to a carrier element using a thermal process selected from a group consisting of plasma deposition, vapor deposition, high-speed flame spraying, and plasma spraying, the heating layer comprising a PTC material having a temperature resistance curve defining a kink, wherein the kink provides an automatic limit to maintain a constant temperature;

applying an insulating layer over the heating layer using a thermal process; and engaging a contact ring over the insulating layer such that the contact ring scores the insulating layer to make electrical contact with the heating layer.

3. The method according to claim 2 further comprising the step of applying an insulating layer to the carrier element using a thermal process before the step of applying the heating layer.

4. The method according to claim 3, wherein the thermal process used to apply the insulating layer to the carrier element is selected from a group consisting of plasma deposition, vapor deposition, high-speed flame spraying, and plasma spraying.

5. The method according to claim 2, further comprising varying a thickness of the heating layer along a length of the carrier element such that an output distribution of power also varies over the length of the carrier element.

* * * * *